US012636740B2

(12) United States Patent
Wowtscherk et al.

(10) Patent No.: US 12,636,740 B2
(45) Date of Patent: May 26, 2026

(54) METHOD AND DEVICE FOR POSITIONING AND METHOD AND DEVICE FOR MACHINING A FLAT WORKPIECE, IN PARTICULAR A SHEET

(71) Applicant: TRUMPF Werkzeugmaschinen SE + Co. KG, Ditzingen (DE)

(72) Inventors: Markus Wowtscherk, Ralbitz-Rosenthal OT Schönau (DE); Patrick Wowtscherk, Neschwitz (DE); Konrad Gnauck, Neukirch (DE); Carsten Böhme, Pulsnitz (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 0 days.

(21) Appl. No.: 19/049,195

(22) Filed: Feb. 10, 2025

(65) Prior Publication Data

US 2025/0178135 A1     Jun. 5, 2025

Related U.S. Application Data

(63) Continuation of application No. PCT/EP2023/071800, filed on Aug. 7, 2023.

(30) Foreign Application Priority Data

Aug. 8, 2022     (DE) ..................... 10 2022 119 892.8

(51) Int. Cl.
| | |
|---|---|
| *B23K 37/02* | (2006.01) |
| *B23K 31/00* | (2006.01) |
| | (Continued) |

(52) U.S. Cl.
CPC .......... B23K 37/0211 (2013.01); B23K 31/00 (2013.01); B23K 37/0408 (2013.01); *B23K 2101/18* (2018.08)

(58) Field of Classification Search
CPC   B23K 37/0211; B23K 37/0408; B23K 31/00; B23K 2101/18; G05B 19/401;
(Continued)

(56) References Cited

U.S. PATENT DOCUMENTS

| | | | | |
|---|---|---|---|---|
| 9,744,621 | B2 * | 8/2017 | Aubry ................ | B23K 26/0846 |
| 2015/0360318 | A1 * | 12/2015 | Aubry ................ | B23K 26/0846 |
| | | | | 219/121.72 |
| 2015/0362895 | A1 * | 12/2015 | Horiguchi .............. | G05B 19/19 |
| | | | | 318/561 |

FOREIGN PATENT DOCUMENTS

| | | | | |
|---|---|---|---|---|
| DE | 20108829 U1 * | 9/2001 | ............. | B65H 16/08 |
| DE | 10157983 A1 * | 6/2003 | ......... | B23K 26/0853 |
| | | (Continued) | | |

*Primary Examiner* — Bayan Salone
(74) *Attorney, Agent, or Firm* — Laurence A. Greenberg; Werner H. Stemer; Ralph E. Locher

(57) ABSTRACT

During a positioning method for positioning a flat workpiece to be machined, in particular a sheet to be machined, for machining by means of a machining device, the workpiece is moved into a machining position by means of a controlled positioning drive with a positioning movement in a feed direction. During the positioning movement, the workpiece is supported on a workpiece support which, during the positioning movement of the workpiece, is moved, by means of a controlled support drive with a support movement in the feed direction. To avoid slippage between the workpiece and the workpiece support during the positioning movement of the workpiece, the support drive and the positioning drive are synchronized prior to the positioning movement of the workpiece by calibrating a control of the support drive and a control of the positioning drive.

15 Claims, 2 Drawing Sheets

(51) Int. Cl.
    *B23K 37/04*        (2006.01)
    *B23K 101/18*      (2006.01)

(58) Field of Classification Search
    CPC ........ G05B 19/402; G05B 2219/37067; G05B
                   2219/37129; G05B 2219/45234
    See application file for complete search history.

(56)                 References Cited

FOREIGN PATENT DOCUMENTS

| DE | 10157983 C5 | 6/2003 | |
|----|-------------|--------|---|
| DE | 102011051156 A1 * | 12/2012 | ......... B23K 37/0235 |
| WO | WO-2014122524 A1 * | 8/2014 | ............. B23K 26/38 |

* cited by examiner

METHOD AND DEVICE FOR POSITIONING AND METHOD AND DEVICE FOR MACHINING A FLAT WORKPIECE, IN PARTICULAR A SHEET

CROSS-REFERENCE TO RELATED APPLICATION

This application is a continuation, under 35 U.S.C. § 120, of copending International Patent Application PCT/EP2023/071800, filed Aug. 7, 2023, which designated the United States; this application also claims the priority, under 35 U.S.C. § 119, of German Patent Application DE 10 2022 119 892.8, filed Aug. 8, 2022; the prior applications are herewith incorporated by reference in their entirety.

FIELD AND BACKGROUND OF THE INVENTION

The invention relates to a positioning method for positioning a flat workpiece to be machined, in particular a sheet to be machined, for machining by way of a machining device, wherein:

the workpiece is moved into a machining position by way of a controlled positioning drive, with a positioning movement in a feed direction, and during the positioning movement, the workpiece is supported on a workpiece support which, during the positioning movement of the workpiece, is moved, by way of a controlled support drive, with a support movement in the feed direction.

The invention also relates to a machining method for machining a flat workpiece, in particular a sheet, by means of a machining device, wherein the workpiece is positioned in a working region of the machining device prior to machining using a positioning method of the above type.

The invention further relates to a device for carrying out the above positioning method and a machine arrangement for carrying out the above machining method.

For example, in sheet machining from a coil, a partial length of a sheet strip wound into a coil is fed to the working space of a machine arrangement for sheet machining as a sheet to be machined after being unwound from the coil and undergoing a subsequent straightening process. A workpiece support is located in the working space of the machine arrangement, on which the sheet is stored in a machining position during machining. Before machining begins, the sheet is moved to the machining position in a feed direction by means of a numerically controlled positioning drive. During its positioning movement, the sheet is supported on the workpiece support. To avoid damage to the sheet surface on the support side in particular, the entire workpiece support follows the sheet movement in the feed direction. To this end, the workpiece support is moved together with the sheet in the feed direction by means of a numerically controlled support drive.

Prior art of the type in question is disclosed in published international patent application WO 2014/122524 A1 and its counterpart U.S. Pat. No. 9,744,621 B2.

SUMMARY OF THE INVENTION

The object of the present invention is to enable a movement of the flat workpiece to be machined to the machining position which ensures a high degree of surface protection. In the case of the invention, the support drive, by means of which the workpiece support loaded with the workpiece to be positioned is moved in the feed direction, and the positioning drive, which drives the workpiece in the feed direction, are synchronized prior to moving a workpiece to the machining position. Through said calibration of the control of the support drive and the control of the positioning drive for this purpose, a synchronization of the workpiece support moved by means of the support drive and of the workpiece moved forward by means of the positioning drive is achieved for the subsequent positioning of a workpiece to be machined. As a result of the synchronization, an otherwise possible slippage between the workpiece support and the workpiece mounted on the workpiece support and stress on the workpiece surface on the support side resulting from the slippage between the workpiece support and the workpiece, in particular mechanical stress, can be avoided.

When machining sheet from a coil, the synchronization of the support drive and the positioning drive according to the invention can be carried out before a first section of the sheet strip wound into the coil to be machined is moved to the machining position. It is also conceivable to interpose a synchronization of the support drive and the positioning drive during the machining of a coil as soon as surface damage is detected on a section of the sheet strip moved to the machining position or on machining products, which indicates a slippage between the workpiece moved to the machining position and the workpiece support.

The workpiece support is preferably designed as an endlessly rotating support belt. In the case of a motorized driving of the support belt by means of a drive wheel, the pitch circle diameter of the drive wheel determines the path length of the support movement resulting from a rotation of the drive wheel. A value for the pitch circle diameter of the drive wheel of the support drive, stored in the numerical control of the support drive by programming the control, can therefore be used as a basis for controlling the support drive.

A numerically controlled drive having at least one feed roller, which moves the test workpiece or the workpiece to be machined in the feed direction via a frictional connection, is particularly suitable as a positioning drive. A measuring wheel rolling on the test workpiece or on the workpiece to be machined can be used to determine the path length of the test and regular positioning movements. A pitch circle diameter of the measuring wheel programmed in the numerical control of the positioning drive is then suitable as a control variable for controlling the positioning drive.

In the event of a deviation of the determined actual path length of the test workpiece movement from the target path length of the test workpiece movement and/or in the event of a deviation of the determined actual distance between the first and second test workpiece markings from the target distance, the desired synchronization of the workpiece support and the workpiece mounted on the workpiece support can be ensured by appropriate reprogramming of the pitch circle diameter of the drive wheel of the support drive used as the control variable and/or of the pitch circle diameter of the measuring wheel of the positioning drive used as the control variable.

The machining device of the machine arrangement according to the invention is designed in particular as a laser processing device, for example as a laser cutting head, and is numerically controlled and can be moved in two axes in a plane running parallel to the workpiece or test workpiece surface.

In the case of the invention, different device designs are conceivable for the marking device used to calibrate the controls of the support drive and the positioning drive. According to the invention, the marking device is preferably a separating device which creates the test workpiece markings as recesses in the test workpieces by separative machining of the test workpieces.

The use of a separating device as a marking device is particularly advantageous in cases in which the synchronization of the support drive and the positioning drive serves to prepare for separative workpiece machining. In this embodiment of the invention, the separating tool used for workpiece machining can also produce the markings on the test workpieces in advance prior to workpiece machining. Due to the usually highly precise position control of the separating tools for the separative workpiece machining, for example of laser cutting heads, the separating tools and their drive control are particularly suitable for use in the calibration according to the invention of the control of the support drive and the control of the positioning drive.

In a preferred embodiment of the method according to the invention, the marking device is used both for creating the test workpiece markings and for detecting the end position of the test workpiece markings. For example, a laser cutting head used as a marking device can be equipped with an optical measuring device and, together with this, move to the test workpiece markings arranged in the end position.

In the interests of simplifying the method, a further development of the positioning method according to the invention provides that the actual distance between the first test workpiece marking and the second test workpiece marking is measured manually. If the test workpiece markings were created as recesses, the actual distance between the first test workpiece marking and the second test workpiece marking is manually determined as the width, extending in the feed direction, of a separating web formed between the first and second recesses of the test workpiece.

A particularly practical application of the invention is the machining of workpieces from coils. A test workpiece that is separate from the workpiece strip to be machined later can be used both for calibrating the control of the support drive and for calibrating the control of the positioning drive. For the calibration of the control of the positioning drive, it is preferable according to the invention to use a partial length of the workpiece strip wound into a coil as a test workpiece.

Other features which are considered as characteristic for the invention are set forth in the appended claims.

Although the invention is illustrated and described herein as embodied in a method and device for positioning and method and device for machining a flat workpiece, in particular a sheet, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
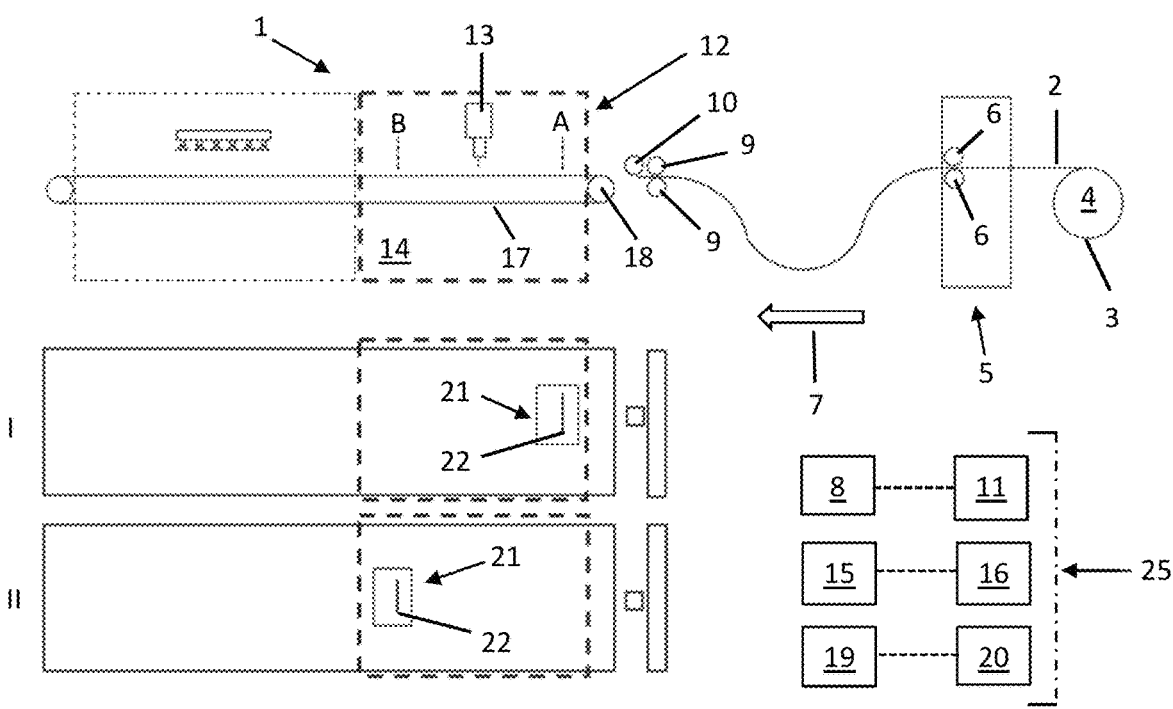
FIG. 1 shows schematic illustrations of the processes for calibrating the control of a support drive as part of a first method type for synchronizing a support drive and a positioning drive for positioning a sheet to be machined on a coil machining system for separative sheet machining.

Referring now to the figures of the drawing in detail a machine configuration 1 shown in FIGS. 1 to 4 serves for separative machining of a workpiece in the form of a strip-shaped sheet 2 which, in an initial state, is wound onto a reel 4 as a coil 3. Adjacent to the reel 4 is a conventional straightening device 5 with straightening rollers 6.

For unwinding the sheet 2 from the coil 3 and for moving the sheet 2 in a feed direction 7, a positioning drive designed as a feed driver 8 is used. The feed driver 8 has two feed rollers 9, which act on the sheet 2 on its upper and lower sides and drive it in a frictionally engaged manner in the feed direction 7. The movement of the sheet 2 in the feed direction 7 generated by the feed driver 8 is detected by means of a measuring wheel 10 of the feed driver 8. The measuring wheel 10 is part of a programmable numerical control 11 of the feed driver 8.

The feed driver 8 is followed in the feed direction 7 by a machining device in the form of a laser cutting machine 12. A laser cutting head 13 is provided as a separating device of the laser cutting machine 12, which can carry out movements in two axes in a horizontal plane of movement in the usual manner in a working space 14 of the laser cutting machine 12. The working space is enclosed by a housing.

The movements of the laser cutting head 13 are generated by means of a device drive 15 which is provided with a programmable numerical control 16.

During its movements, the laser cutting head 13 moves over a workpiece support, which in the illustrated example is designed as an endlessly rotating support belt 17. With its upper run designed to support the sheet 2, the support belt 17 is driven in the feed direction 7 by a drive wheel 18 of a support drive 19. The support drive 19 is controlled by a programmable numerical control 20.

The control 11 of the feed driver 8, the control 16 of the device control 15 for the laser cutting head 13 and the control 20 of the support drive 19 are integrated into a higher-level numerical device control 25 of the machine arrangement 1.

At the beginning of the cutting operation of the machine arrangement 1, the sheet 2 is moved by means of the feed driver 8 in the feed direction 7 to a machining position on the support belt 17. During the positioning movement of the sheet 2 generated by the feed driver 8, the support belt 17 also moves in the feed direction 7. This is intended to prevent slippage between the sheet 2 and the support belt 17. Such slippage could in particular lead to damage to a sensitive sheet surface, for example could lead to scratches on the sheet surface.

In order to prevent slippage between the sheet 2 and the support belt 17 during cutting operation of the machine arrangement 1, the support drive 19 and the feed driver 8 are synchronized before the sheet 2 is transferred to a machining position for the first time. For this purpose, the control 20 of the support drive 19 and the control 11 of the feed driver 8 are calibrated.

Figure 2:
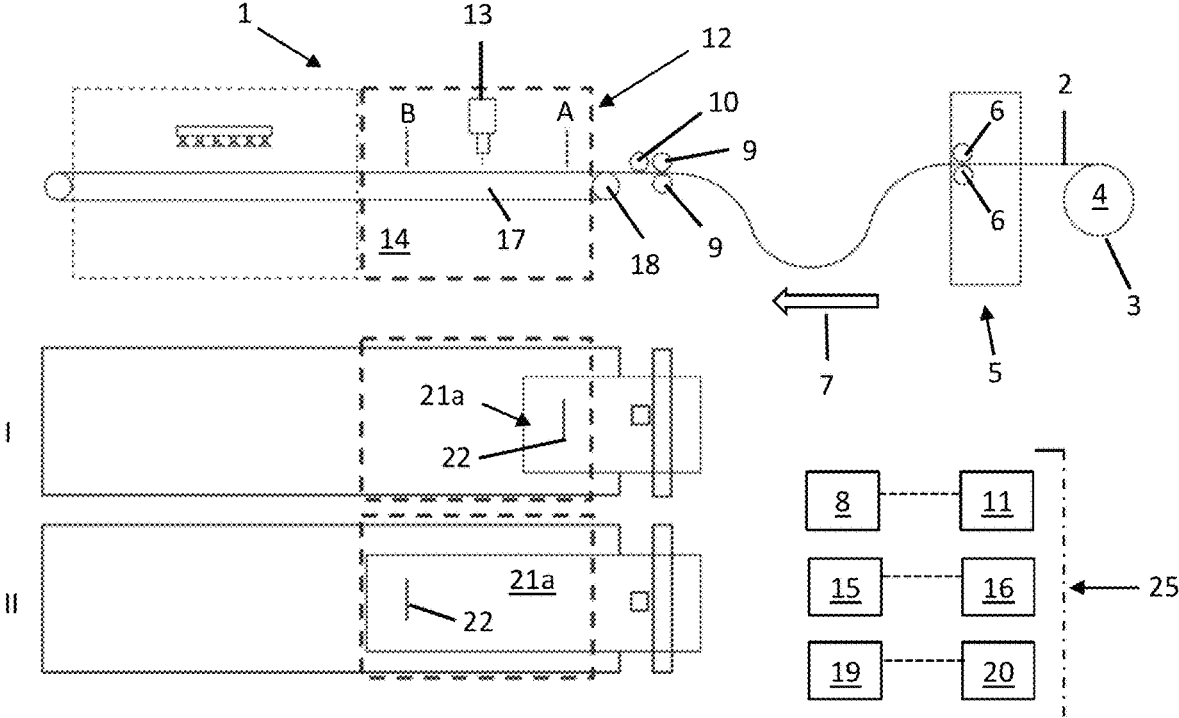
FIG. 2 shows schematic illustrations of the processes for calibrating the control of the positioning drive as part of the method according to FIG. 1 for synchronizing a support drive and a positioning drive of a coil machining system for separative sheet machining.

A first option for calibrating the control 20 of the support drive 19 and the control 11 of the feed driver 8 is illustrated in FIGS. 1 and 2. The calibration of the control 20 of the support drive 19 is shown in FIG. 1 and the calibration of the control 11 of the feed driver 8 is shown in FIG. 2.

Figure 3:
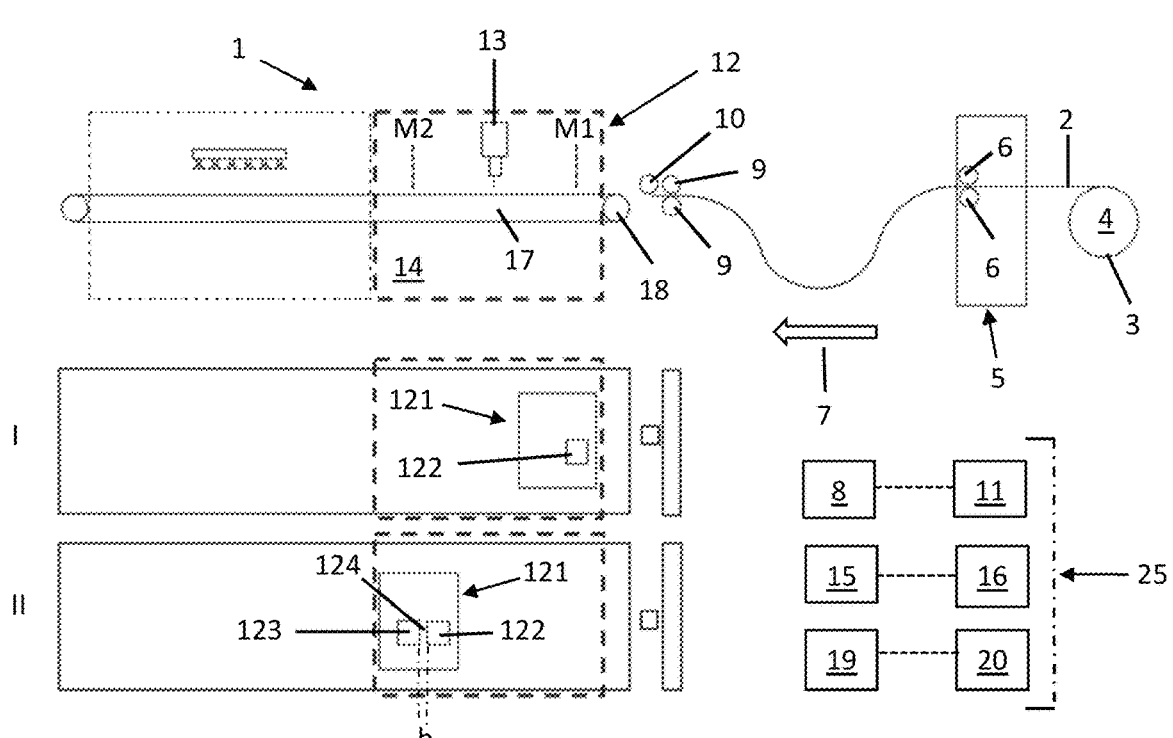
FIG. 3 shows schematic illustrations of the processes for calibrating the control of a support drive as part of a second method type for synchronizing a support drive and a positioning drive for positioning a sheet to be machined on a coil machining system for separative sheet machining.
Figure 4:
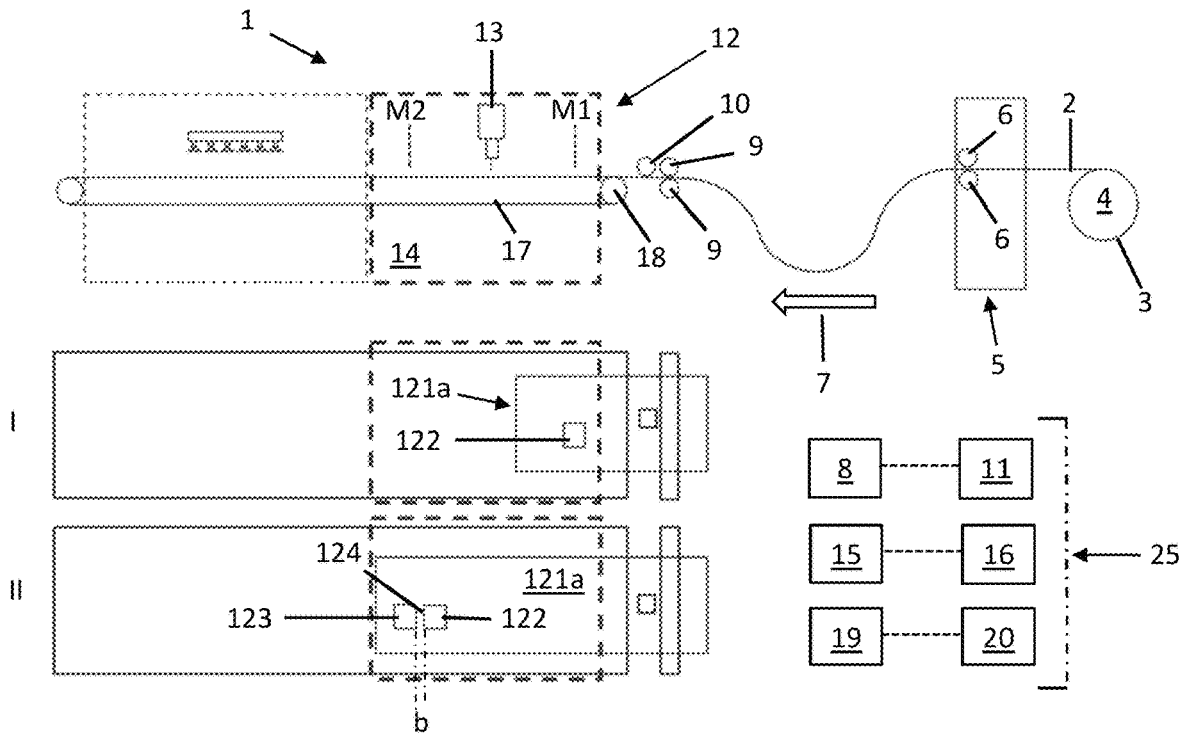
FIG. 4 shows schematic illustrations of the processes for calibrating the control of the positioning drive as part of the method according to FIG. 1 for synchronizing a support drive and a positioning drive of a coil machining system for separative sheet machining.

A second option for calibrating the control 20 of the support drive 19 and the control 11 of the feed driver 8 is shown in FIGS. 3 and 4, wherein FIG. 3 shows the calibration of the control 20 of the support drive 19 and FIG. 4 shows the calibration of the control 11 of the feed driver 8.

According to FIG. 1, a test workpiece in the form of a test sheet panel 21, separate from the sheet 2 to be machined later, is arranged on the support belt 17 with an initial position in the feed direction 7 for calibrating the control 20 of the support drive 19. Subsequently, by means of the laser cutting head 13 used as a marking device, a recess in the form of a test cut 22 is created on the test sheet panel 21 arranged in the initial position as a test workpiece marking. The resulting conditions are shown in partial illustration I of FIG. 1.

With the test sheet panel 21 arranged in the initial position, a starting position A of the test cut 22 in the feed direction 7 is determined in a coordinate system of the control 16 of the device drive 15 of the laser cutting head 13.

The support belt 17 is subsequently moved by means of the support drive 19, with a test support movement over a path length of the test support movement in the feed direction 7. Together with the support belt 17, the test sheet panel 21, supported on the support belt 17 and provided with the test cut 22, moves over the path length of the test support movement to a target position. As a result, the test cut 22 reaches an end position B. The resulting conditions are shown in partial illustration II of FIG. 1.

To move the test sheet panel 21 from the initial position to the target position, the control 20 controls the support drive 19 using a value stored in the control 20 by programming the control 20 for the pitch circle diameter of the drive wheel 18 of the support drive 19 provided as a control variable. The pitch circle diameter of the drive wheel 18 of the support drive 19 stored in the control 20 defines a target path length of the movement of the workpiece support 17 and the movement of the test sheet panel 21 simultaneously generated by means of the support drive 19.

Once the test sheet panel 21 has reached the target position shown in partial illustration II of FIG. 1, the end position B of the test cut 22 in the feed direction 7 is determined in the coordinate system of the control 16 of the device drive 15 of the laser cutting head 13. For this purpose, the laser cutting head 13 moves to the test cut 22 starting from the starting position A in the feed direction 7 with an optical measuring device of conventional design integrated into the laser cutting head 13 and not shown in the drawings. In this case, the distance between the starting position A of the test cut 22 and the end position B of the test cut 22 in the coordinate system of the control 16 of the device drive 15 of the laser cutting head 13 in the feed direction 7 is determined as an actual path length of the movement of the test sheet panel 21 generated by means of the support drive 19.

The actual path length and the target path length of the movement of the test sheet panel 21 are then compared.

In the event of a deviation of the actual path length from the target path length of the movement of the test sheet panel 21 generated by means of the support drive 19, a correction is made to the value stored in the control 20 of the support drive 19 for the pitch circle diameter of the drive wheel 18 of the support drive 19 provided as a control variable. As a result, the actual path length of the movement of the test sheet panel 21 generated by the support drive 19 is adapted to the target path length of the movement of the test sheet panel 21.

The same method is used to calibrate the control 11 of the feed driver 8.

As shown in FIG. 2, in order to calibrate the control 11 of the feed driver 8, a test length 21a of the sheet 2, which is not intended for subsequent machining, is arranged on the support belt 17 with an initial position in the feed direction 7 as a test workpiece. By means of the laser cutting head 13, a test cut 22 is created on the test length 21a of the sheet 2 arranged in the initial position as a test workpiece marking (partial illustration I of FIG. 2).

With the test length 21a of the sheet 2 arranged in the initial position, a starting position A of the test cut 22 in the feed direction 7 is determined in a coordinate system of the control 16 of the device drive 15 of the laser cutting head 13.

Subsequently, the test length 21a of the sheet 2 is moved by means of the feed driver 8 with a test positioning movement over a path length of the test positioning movement in the feed direction 7. As a result, the test length 21a of the sheet 2 reaches a target position and the test cut 22 reaches an end position B (partial illustration II of FIG. 2).

To move the test length 21a of the sheet 2 over the path length of the test positioning movement, the control 11 controls the feed driver 8 using a value stored in the control 11 by programming the control 11 for the pitch circle diameter of the measuring wheel 10 of the feed driver 8 provided as a control variable. The value programmed as a control variable for the pitch circle diameter of the measuring wheel 10 of the feed driver 8 represents a target path length of the test positioning movement of the test length 21a of the sheet 2, which corresponds to the target path length of the movement of the workpiece support 17 and the movement of the test sheet panel 21 during calibration of the control 20 of the support drive 19.

Once the test length 21a of the sheet 2 has reached the target position shown in partial illustration II of FIG. 2, the end position B of the test cut 22 in the feed direction 7 is determined in the coordinate system of the control 16 of the device drive 15 of the laser cutting head 13. For this purpose too, the laser cutting head 13 moves to the test cut 22 starting from the starting position A with the optical measuring device integrated in the laser cutting head 13 in the feed direction 7. The distance between the starting position A of the test cut 22 and the end position B of the test cut 22 in the coordinate system of the control 16 of the device drive 15 of the laser cutting head 13 in the feed direction 7 is determined as an actual path length of the test positioning movement of the test length 21a of the sheet 2 generated by means of the feed driver 8.

The actual path length and the target path length of the test positioning movement of the test length 21a of the sheet 2 are then compared. In the event of a deviation of the actual path length from the target path length of the test positioning movement of the test length 21a of the sheet 2 generated by means of the feed driver 8, a correction of the value stored in the control 11 of the feed driver 8 for the pitch circle diameter of the measuring wheel 10 of the feed driver 8 is carried out in order to adapt the actual path length to the target path length of the test positioning movement of the test length 21$a$ of the sheet 2 generated by means of the feed driver 8.

Due to the thus completed calibration of the control 20 of the feed drive 19 and the control 11 of the feed driver 8, synchronization of the sheet 2, moved to the machining position by means of the feed driver 8, and the support belt 17, moved in the feed direction 7 by means of the support drive 19 and supporting the sheet 2, is ensured for the subsequent machining of the sheet 2.

In the context of the positioning method according to FIGS. 3 and 4, the control 20 of the support drive 19 is calibrated as follows, as shown in FIG. 3:

As a test workpiece, a test sheet panel 121 is arranged with an initial position in the feed direction 7 on the support belt 17. The laser cutting head 13 is moved in the feed direction 7 by means of the device drive 15 to a first marking position M1. With a separating movement defined relative to the first marking position M1, the laser cutting head 13 used as a marking device creates a first test recess 122 on the test sheet panel 121 arranged in the initial position as the first test workpiece marking.

The resulting conditions are shown in partial illustration I of FIG. 3.

By means of the support drive 19, the support belt 17 is now moved with a test support movement over a path length of the test support movement in the feed direction 7. Together with the support belt 17, the test sheet panel 121, supported on the support belt 17 and provided with the first test recess 122, moves in the feed direction 7. The path length of the movement of the test sheet panel 121 in the feed direction 7 corresponds to the path length of the test support movement in the feed direction 7.

To move the test sheet panel 121 over the path length of the test support movement, the control 20 controls the support drive 19 using a value programmed into the control 20 for the pitch circle diameter of the drive wheel 18 of the support drive 19, which is provided as a control variable. Based on the programmed value for the pitch circle diameter of the drive wheel 18 of the support drive 19, the support drive 19 is intended to move the test sheet panel 121 over a defined target path length of the movement of the test sheet panel 121 generated by the support drive 19.

In the target position at the end of its movement in the feed direction 7, the test sheet panel 121 is shown in partial illustration II of FIG. 3.

The laser cutting head 13 is now moved by means of the device drive 15, from the first marking position M1 to a second marking position M2, with a device movement in the feed direction 7 over a path length of the device movement. With a separating movement defined relative to the second marking position M2, the laser cutting head 13 now creates a second test recess 123 on the test sheet panel 121 arranged in the target position, which in the case shown is identical to the first test recess 122.

The path length of the movement of the laser cutting head 13 from the first marking position M1 to the second marking position M2 in the feed direction 7 is dimensioned by appropriate programming of the control 16 of the device drive 15 of the laser cutting head 13 on the basis of the target path length of the movement of the test sheet panel 121 generated by means of the support drive 19, in such a way that the first test recess 122 and the second test recess 123 of the test sheet panel 121 have a target distance in a coordinate system of the control 16 of the device drive 15 of the laser cutting head 13 in the feed direction 7.

The real distance, i.e., the actual distance, between the first test recess 122 and the second test recess 123 on the test sheet panel 121, is embodied by the width b in the feed direction 7 of a separating web 124 formed on the test sheet panel 121 between the first test recess 122 and the second test recess 123.

The actual distance between the first test recess 122 and the second test recess 123 can therefore be determined by a manual measurement of the width b of the separating web 124 in the exemplary case shown. The width b of the separating web 124 is compared with the target distance between the first test recess 122 and the second test recess 123 in the feed direction 7.

If this comparison reveals a deviation of the actual distance (width b of the separating web 124) from the target distance between the first test recess 122 and the second test recess 123, the value stored in the control 20 of the support drive 19 for the pitch circle diameter of the drive wheel 18 of the support drive 19 is corrected in order to adapt the actual distance between the first test recess 122 and the second test recess 123 to the target distance.

The control 11 of the feed driver 8 provided as a positioning drive is calibrated as part of the positioning method according to FIGS. 3 and 4 in the manner illustrated in FIG. 4:

A test length 121$a$ of the sheet 2, which is not intended for subsequent machining, is arranged on the support belt 17 with an initial position in the feed direction 7 as a test workpiece. The laser cutting head 13 is moved in the feed direction 7 by means of the device drive 15 to a first marking position M1. With a separating movement defined relative to the first marking position M1, the laser cutting head 13 used as a marking device creates a first test recess 122 as a first test workpiece marking on the test length 121$a$ of the sheet 2 arranged in the initial position (partial illustration I of FIG. 4).

By means of the feed driver 8, the test length 121$a$ of the sheet 2 is now moved with a test positioning movement over a path length of the test positioning movement in the feed direction 7.

To move the test length 121$a$ of the sheet 2 over the path length of the test positioning movement, the control 11 controls the feed driver 8 using a value programmed into the control 11 for the pitch circle diameter of the measuring wheel 10 of the feed driver 8 provided as a control variable. Based on the programmed value for the pitch circle diameter of the measuring wheel 10 of the feed driver 8, the feed driver 8 is intended to move the test length 121$a$ of the sheet 2 over a defined target path length of the test positioning movement generated by means of the feed driver 8.

In the target position at the end of its test positioning movement in the feed direction 7, the test length 121$a$ of the sheet 2 is shown in partial illustration II of FIG. 4.

The laser cutting head 13 is now moved by means of the device drive 15, from the first marking position M1 to a second marking position M2, with a device movement in the feed direction 7 over a path length of the device movement. With a separating movement of the laser cutting head 13 defined relative to the second marking position M2, a second test recess 123 is created at the test length 121$a$ of the sheet 2 arranged in the target position.

The path length of the movement of the laser cutting head 13 from the first marking position M1 to the second marking position M2 in the feed direction 7 is dimensioned by appropriate programming of the control 16 of the device drive 15 of the laser cutting head 13 on the basis of the target path length of the movement of the test length 121$a$ of the sheet 2 generated by means of the support drive 19, in such a way that the first test recess 122 and the second test recess 123 of the test length 121*a* of the sheet 2 have a target distance in a coordinate system of the control 16 of the device drive 15 of the laser cutting head 13 in the feed direction 7.

The real distance or the actual distance between the first test recess 122 and the second test recess 123 on the test sheet panel 121 is in turn determined by a manual measurement of the width b of a separating web 124 between the first test recess 122 and the second test recess 123. The width b of the separating web 124 is compared with the target distance between the first test recess 122 and the second test recess 123.

In the event of a deviation of the actual distance (width b of the separating web 124) from the target distance between the first test recess 122 and the second test recess 123, the value stored in the control 11 of the feed driver 8 for the pitch circle diameter of the measuring wheel 10 of the feed driver 8 is corrected in order to adapt the actual distance between the first test recess 122 and the second test recess 123 to the target distance.

As a result of the resulting synchronization of the support drive 19 and the feed driver 8, during the subsequent positioning of the sheet 2 for machining purposes, slippage between the sheet 2, which is moved forward to a machining position by means of the feed driver 8, and the support belt, which 17 supports the sheet 2 and also moves in the feed direction 7, is prevented.

The invention claimed is:

1. A positioning method for positioning a flat workpiece to be machined by a machining device, the method comprising:

moving the workpiece into a machining position by way of a controlled positioning drive, with a positioning movement in a feed direction; and during the positioning movement, supporting the workpiece on a workpiece support and moving the workpiece support during the positioning movement of the workpiece, by way of a controlled support drive with a support movement in the feed direction;

synchronizing the support drive and the positioning drive prior to the positioning movement of the workpiece by calibrating a control of the support drive and a control of the positioning drive;

wherein calibrating the control of the support drive comprises:

arranging a test workpiece on the workpiece support with an initial position in the feed direction;

creating a test workpiece marking, by a marking device, on the test workpiece arranged in the initial position;

determining, for the test workpiece arranged in the initial position, a starting position of the test workpiece marking in the feed direction in a coordinate system of a control of a device drive of the marking device;

moving the workpiece support, by the support drive, with a test support movement over a path length of the test support movement in the feed direction, wherein the test workpiece supported on the workpiece support and provided with the test workpiece marking is moved together with the workpiece support in the feed direction by the support drive and is thereby moved to a target position with a test workpiece movement over a path length of the test workpiece movement in the feed direction that corresponds to a path length of the test support movement, and wherein the control of the support drive controls the support drive for carrying out the test support movement by way of a control variable for dimensioning the path length of the test support movement and the path length of the test workpiece movement generated by the support drive as a defined target path length of the test workpiece movement generated by the support drive;

determining, for the test workpiece arranged in the target position, an end position of the test workpiece marking in the feed direction in the coordinate system of the control of the device drive of the marking device;

determining a distance between the starting position of the test workpiece marking and the end position of the test workpiece marking in the coordinate system of the control of the device drive of the marking device in the feed direction as an actual path length of the test workpiece movement generated by the support drive;

comparing the actual path length of the test workpiece movement generated by the support drive and the target path length of the test workpiece movement generated by the support drive; and correcting the control variable for controlling the support drive, by adapting the actual path length of the test workpiece movement generated by the support drive to the target path length of the test workpiece movement generated by the support drive, when the actual path length of the test workpiece movement generated by the support drive deviates from the target path length of the test workpiece movement generated by the support drive; and wherein calibrating the control of the positioning drive comprises:

arranging a test workpiece on the workpiece support with an initial position in the feed direction;

creating a test workpiece marking, by a marking device, on the test workpiece arranged in the initial position;

determining, for the test workpiece arranged in the initial position, a starting position of the test workpiece marking in the feed direction in a coordinate system of the control of the device drive of the marking device;

moving the test workpiece provided with the first test workpiece marking, by the positioning drive, with a test positioning movement over a path length of the test positioning movement in the feed direction to a target position, wherein, using a control variable, the control of the positioning drive controls the positioning drive for carrying out the test positioning movement for dimensioning the path length of the test positioning movement as a defined target path length of the test positioning movement, which corresponds to the target path length of the test workpiece movement generated by the support drive;

determining, for the test workpiece arranged in the target position, an end position of the test workpiece marking in the feed direction in the coordinate system of the control of the device drive of the marking device;

determining a distance between the starting position of the test workpiece marking and the end position of the test workpiece marking in the coordinate system of the control of the device drive of the marking device in the feed direction as an actual path length of the test positioning movement;

comparing the actual path length of the test positioning movement and the target path length of the test positioning movement; and correcting the control variable for controlling the positioning drive by adapting the actual path length of the test positioning movement to the target path length of the test positioning movement, when the actual path length of the test positioning movement deviates from the target path length of the test positioning movement.

2. The positioning method according to claim 1, wherein the flat workpiece is a sheet to be machined by a sheet machining device.

3. The positioning method according to claim 1, which comprises, with a separating device configured as a marking device, forming a recess in the test workpiece as a test workpiece marking on the test workpiece arranged in the initial position.

4. The positioning method according to claim 3, which comprises determining, for the test workpiece arranged in the target position, the end position of the test workpiece marking in the feed direction in the coordinate system of the control of the device drive of the marking device, by approaching the test workpiece marking with a detection device provided on the marking device by way of the device drive of the marking device.

5. A positioning method for positioning a flat workpiece to be machined by a machining device, the method comprising:

moving the workpiece into a machining position by a controlled positioning drive, with a positioning movement in a feed direction, and during the positioning movement, moving the workpiece which is supported on a workpiece support which, during the positioning movement of the workpiece, is moved by a controlled support drive with a support movement in the feed direction;

synchronizing the support drive and the positioning drive prior to the positioning movement of the workpiece by calibrating a control of the support drive and a control of the positioning drive;

wherein calibrating the control of the support drive comprises:

arranging a test workpiece on the workpiece support with an initial position in the feed direction;

moving a marking device in the feed direction into a first marking position by a controlled device drive;

creating a first test workpiece marking on the test workpiece arranged in the initial position by the marking device arranged in a defined manner opposite the first marking position;

moving the workpiece support, by the support drive, with a test support movement over a path length of the test support movement in the feed direction, wherein the test workpiece supported on the workpiece support and provided with the first test workpiece marking is moved together with the workpiece support in the feed direction by the support drive and is thereby moved to a target position with a test workpiece movement over a path length of the test workpiece movement in the feed direction that corresponds to the path length of the test support movement, and wherein the control of the support drive controls the support drive for carrying out the test support movement by way of a control variable for dimensioning the path length of the test support movement and the test workpiece movement as a defined target path length of the test workpiece movement generated by the support drive;

moving the marking device, by the device drive, from the first marking position to a second marking position with a device movement in the feed direction over a path length of the device movement;

creating a second test workpiece marking on the test workpiece arranged in the target position by the marking device arranged in a defined manner opposite the second marking position;

dimensioning the path length of the device movement, by way of the control of the device drive of the marking device, on a basis of the target path length of the test workpiece movement generated by the support drive, in such a way that the first test workpiece marking and the second test workpiece marking have a target distance in the feed direction in a coordinate system of the control of the device drive of the marking device;

determining a real distance between the first test workpiece marking and the second test workpiece marking as an actual distance between the first test workpiece marking and the second test workpiece marking in the feed direction;

comparing the actual distance between the first test workpiece marking and the second test workpiece marking and the target distance between the first test workpiece marking and the second test workpiece marking; and correcting the control variable for controlling the support drive in the sense of adapting the actual distance between the first test workpiece marking and the second test workpiece marking to the target distance between the first test workpiece marking and the second test workpiece marking, when the actual distance between the first test workpiece marking and the second test workpiece marking deviates from the target distance between the first test workpiece marking and the second test workpiece marking;

and wherein calibrating the control of the positioning drive comprises:

arranging a test workpiece on the workpiece support with an initial position in the feed direction;

moving a marking device in the feed direction into a first marking position by a controlled device drive;

creating a first test workpiece marking on the test workpiece arranged in the initial position by the marking device arranged in a defined manner opposite the first marking position;

moving the test workpiece provided with the first test workpiece marking, by the positioning drive, with a test positioning movement over a path length of the test positioning movement in the feed direction to a target position, wherein, using a control variable, the control of the positioning drive controls the positioning drive for carrying out the test positioning movement for dimensioning the path length of the test positioning movement as a target path length of the test positioning movement, which corresponds to the target path length of the test workpiece movement generated by means of the support drive;

moving the marking device, by the device drive, from the first marking position to a second marking position with a device movement in the feed direction over a path length of the device movement;

creating a second test workpiece marking on the test workpiece arranged in the target position by the marking device arranged in a defined manner oppo- site the second marking position;

dimensioning the path length of the device movement, by way of the control of the device drive of the marking device, on the basis of the target path length of the test workpiece movement generated by the support drive, in such a way that the first test workpiece marking and the second test workpiece marking have a target distance in the feed direction in a coordinate system of the control of the device drive of the marking device;

determining a real distance between the first test work- piece marking and the second test workpiece mark- ing as an actual distance between the first test workpiece marking and the second test workpiece marking;

comparing the actual distance between the first test workpiece marking and the second test workpiece marking and the target distance between the first test workpiece marking and the second test workpiece marking; and correcting the control variable for controlling the posi- tioning drive in the sense of adapting the actual distance between the first test workpiece marking and the second test workpiece marking to the target distance between the first test workpiece marking and the second test workpiece marking, when the actual distance between the first test workpiece marking and the second test workpiece marking deviates from the target distance between the first test workpiece marking and the second test work- piece marking.

6. The positioning method according to claim 5, which comprises:

by a separating device provided as a marking device, creating a first recess of the test workpiece as a first test workpiece marking on the test workpiece arranged in the starting position and creating a second recess of the test workpiece as a second test workpiece marking on the test workpiece arranged in the target position;

by the control of the device drive of the marking device, dimensioning the path length of the device movement on the basis of the target path length of the test workpiece movement generated by the support drive, in such a way that a separating web is created between the first recess of the test workpiece and the second recess of the test workpiece having a target width forming the target distance between the first recess of the test workpiece and the second recess of the test workpiece in the feed direction;

determining a real width of the separating web between the first recess of the test workpiece and the second recess of the test workpiece as an actual width of the separating web;

comparing the actual width of the separating web with the target width of the separating web; and correcting the control variable for controlling the posi- tioning drive in order to adapt the actual width of the separating web to the target width of the separating web, when the actual width of the separating web deviates from the target width of the separating web.

7. The positioning method according to claim 5, which comprises determining the real distance between the first test workpiece marking and the second test workpiece marking as the actual distance between the first test workpiece marking and the second test workpiece marking by manually measuring the real distance between the first test workpiece marking and the second test workpiece marking.

8. The positioning method according to claim 5, which comprises:

unwinding a workpiece from a coil;

separating the workpiece from the coil and using the separated workpiece as a test workpiece for calibrating the control of the support drive; and using a partial length of the coil connected to a remaining coil as a test workpiece for calibrating the control of the positioning drive.

9. The positioning method according to claim 5, wherein the flat workpiece is a sheet unwound from the coil.

10. A machining method for machining a flat workpiece with a machining device, the method comprising:

positioning the workpiece in a working region of the machining device prior to machining by carrying out the positioning method according to claim 1;

thereby moving the workpiece into a machining position by a controlled positioning drive, with a positioning movement in a feed direction; and during the positioning movement, supporting the work- piece on a workpiece support which, during the posi- tioning movement of the workpiece, is moved, by a controlled support drive with a support movement in the feed direction.

11. The machining method according to claim 10 for separative machining of a flat workpiece by a separating tool, wherein the separating tool for separative workpiece machining is used as a separating device for creating the test workpiece marking on the test workpiece arranged in the initial position, or as a separating device for creating the first test workpiece marking on the test workpiece arranged in the initial position and the second test workpiece marking on the test workpiece arranged in the target position.

12. A positioning device for positioning a flat workpiece to be machined by a machining device, the positioning device comprising:

a positioning drive configured for moving the workpiece into a machining position with a positioning movement in a feed direction;

a workpiece support configured to support the workpiece during a positioning movement and a support drive configured to move the workpiece support with a support movement in the feed direction during the positioning movement of the workpiece; and a numerical device control having a control of the support drive of the workpiece support and a control of the positioning drive;

wherein the support drive and the positioning drive are to be synchronized prior to the positioning movement of the workpiece by calibration of a control of the support drive and a control of the positioning drive;

wherein the control of the support drive is calibrated:

by arranging a test workpiece on the workpiece support with an initial position in the feed direction;

by creating a test workpiece marking, by a marking device, on the test workpiece arranged in the initial position;

by determining, for the test workpiece arranged in the initial position, a starting position of the test work- piece marking in the feed direction in a coordinate system of a control of a device drive of the marking device;

by moving the workpiece support, by the support drive, with a test support movement over a path length of the test support movement in the feed direction, wherein the test workpiece supported on the workpiece support and provided with the test workpiece marking is moved together with the workpiece support in the feed direction by means of the support drive and is thereby moved to a target position with a test workpiece movement over a path length of the test workpiece movement in the feed direction that corresponds to the path length of the test support movement, and wherein the control of the support drive controls the support drive for carrying out the test support movement by means of a control variable for dimensioning the path length of the test support movement and the path length of the test workpiece movement generated by means of the support drive as a defined target path length of the test workpiece movement generated by means of the support drive;

by determining, for the test workpiece arranged in the target position, an end position of the test workpiece marking in the feed direction in the coordinate system of the control of the device drive of the marking device;

by determining a distance between the starting position of the test workpiece marking and the end position of the test workpiece marking in the coordinate system of the control of the device drive of the marking device in the feed direction as an actual path length of the test workpiece movement generated by means of the support drive;

by comparing the actual path length of the test workpiece movement generated by; the support drive and the target path length of the test workpiece movement generated by; the support drive; and by correcting the control variable for controlling the support drive, in the sense of adapting the actual path length of the test workpiece movement generated by means of the support drive to the target path length of the test workpiece movement generated by means of the support drive, when the actual path length of the test workpiece movement generated by means of the support drive deviates from the target path length of the test workpiece movement generated by means of the support drive;

and wherein the control of the positioning drive is calibrated:

by arranging a test workpiece on the workpiece support with an initial position in the feed direction;

by creating a test workpiece marking, by a marking device, on the test workpiece arranged in the initial position;

by determining, for the test workpiece arranged in the initial position, a starting position of the test workpiece marking in the feed direction in a coordinate system of the control of the device drive of the marking device;

by moving the test workpiece provided with the first test workpiece marking, by; the positioning drive, with a test positioning movement over a path length of the test positioning movement in the feed direction to a target position, wherein, using a control variable, the control of the positioning drive controls the positioning drive for carrying out the test positioning movement for dimensioning the path length of the test positioning movement as a defined target path length of the test positioning movement, which corresponds to the target path length of the test workpiece movement generated by means of the support drive;

by determining, for the test workpiece arranged in the target position, an end position of the test workpiece marking in the feed direction in the coordinate system of the control of the device drive of the marking device;

by determining a distance between the starting position of the test workpiece marking and the end position of the test workpiece marking in the coordinate system of the control of the device drive of the marking device in the feed direction as an actual path length of the test positioning movement;

by comparing the actual path length of the test positioning movement and the target path length of the test positioning movement; and by correcting the control variable for controlling the positioning drive in the sense of adapting the actual path length of the test positioning movement to the target path length of the test positioning movement, when the actual path length of the test positioning movement deviates from the target path length of the test positioning movement.

13. A positioning device for positioning a flat workpiece to be machined by a machining device, the positioning device comprising:

a positioning drive configured to move the workpiece into a machining position with a positioning movement in a feed direction;

a workpiece support configured to support the workpiece during the positioning movement, and a support drive configured for moving the workpiece support with a support movement in the feed direction during the positioning movement of the workpiece; and a numerical device control having a control of the support drive of the workpiece support and a control of the positioning drive;

wherein the support drive and the positioning drive are to be synchronized prior to the positioning movement of the workpiece by calibrating a control of the support drive and a control of the positioning drive;

wherein the control of the support drive is to be calibrated:

by arranging a test workpiece on the workpiece support with an initial position in the feed direction;

by moving a marking device in the feed direction into a first marking position by a controlled device drive;

by creating a first test workpiece marking on the test workpiece arranged in the initial position by the marking device arranged in a defined manner opposite the first marking position;

by moving the workpiece support, by means of the support drive, with a test support movement over a path length of the test support movement in the feed direction, wherein the test workpiece supported on the workpiece support and provided with the first test workpiece marking is moved together with the workpiece support in the feed direction by means of the support drive and is thereby moved to a target position with a test workpiece movement over a path length of the test workpiece movement in the feed direction that corresponds to the path length of the test support movement, and wherein the control of the support drive controls the support drive for carrying out the test support movement by means of a control variable for dimensioning the path length of the test support movement and the test workpiece movement as a defined target path length of the test workpiece movement generated by means of the support drive;

by moving the marking device, by means of the device drive, from the first marking position to a second marking position with a device movement in the feed direction over a path length of the device movement;

by creating a second test workpiece marking on the test workpiece arranged in the target position by means of the marking device arranged in a defined manner opposite the second marking position;

by dimensioning the path length of the device movement, by way of the control of the device drive of the marking device, on the basis of the target path length of the test workpiece movement generated by means of the support drive, in such a way that the first test workpiece marking and the second test workpiece marking have a target distance in the feed direction in a coordinate system of the control of the device drive of the marking device;

by determining a real distance between the first test workpiece marking and the second test workpiece marking as an actual distance between the first test workpiece marking and the second test workpiece marking in the feed direction;

by comparing the actual distance between the first test workpiece marking and the second test workpiece marking and the target distance between the first test workpiece marking and the second test workpiece marking; and by correcting the control variable for controlling the support drive in the sense of adapting the actual distance between the first test workpiece marking and the second test workpiece marking to the target distance between the first test workpiece marking and the second test workpiece marking, when the actual distance between the first test workpiece marking and the second test workpiece marking deviates from the target distance between the first test workpiece marking and the second test workpiece marking, and wherein the control of the positioning drive is to be calibrated:

by arranging a test workpiece on the workpiece support with an initial position in the feed direction;

by moving a marking device in the feed direction into a first marking position by means of a controlled device drive;

by creating a first test workpiece marking on the test workpiece arranged in the initial position by means of the marking device arranged in a defined manner opposite the first marking position;

by moving the test workpiece provided with the first test workpiece marking, by means of the positioning drive, with a test positioning movement over a path length of the test positioning movement in the feed direction to a target position, wherein, using a control variable, the control of the positioning drive controls the positioning drive for carrying out the test positioning movement for dimensioning the path length of the test positioning movement as a target path length of the test positioning movement, which corresponds to the target path length of the test workpiece movement generated by means of the support drive;

by moving the marking device, by means of the device drive, from the first marking position to a second marking position with a device movement in the feed direction over a path length of the device movement;

by creating a second test workpiece marking on the test workpiece arranged in the target position by means of the marking device arranged in a defined manner opposite the second marking position;

by dimensioning the path length of the device movement, by means of the control of the device drive of the marking device, on the basis of the target path length of the test workpiece movement generated by means of the support drive, in such a way that the first test workpiece marking and the second test workpiece marking have a target distance in the feed direction in a coordinate system of the control of the device drive of the marking device;

by determining a real distance between the first test workpiece marking and the second test workpiece marking as an actual distance between the first test workpiece marking and the second test workpiece marking;

by comparing the actual distance between the first test workpiece marking and the second test workpiece marking and the target distance between the first test workpiece marking and the second test workpiece marking; and by correcting the control variable for controlling the positioning drive in the sense of adapting the actual distance between the first test workpiece marking and the second test workpiece marking to the target distance between the first test workpiece marking and the second test workpiece marking, when the actual distance between the first test workpiece marking and the second test workpiece marking deviates from the target distance between the first test workpiece marking and the second test workpiece marking.

14. A machine arrangement for machining a flat workpiece, the machine comprising:

a machining device which has a working region with a workpiece support configured to support the workpiece in a machining position during machining; and the positioning device according to claim 12 configured for moving the workpiece to the machining position on the workpiece support prior to machining.

15. The machine according to claim 14, configured for machining sheet metal sheets.

* * * * *